(12) United States Patent
Ashton et al.

(10) Patent No.: US 9,342,825 B2
(45) Date of Patent: May 17, 2016

(54) SOFTWARE LICENSE AND INSTALLATION PROCESS MANAGEMENT WITHIN AN ORGANIZATION

(75) Inventors: Miriam R. Ashton, Alameda, CA (US); Randy S. Johnson, O Fallon, MO (US); Tedrick N. Northway, Wood River, IL (US); Jacqueline Sveda, Ross, CA (US); Caryn L. Woodruff, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 1090 days.

(21) Appl. No.: 12/797,902

(22) Filed: Jun. 10, 2010

(65) Prior Publication Data

US 2011/0307958 A1  Dec. 15, 2011

(51) Int. Cl.
 G06Q 20/00 (2012.01)
 G06Q 20/12 (2012.01)
 G06F 21/10 (2013.01)
 G06F 9/445 (2006.01)

(52) U.S. Cl.
 CPC .......... *G06Q 20/1235* (2013.01); *G06F 21/105* (2013.01); *G06F 8/61* (2013.01); *G06Q 2220/18* (2013.01)

(58) Field of Classification Search
 CPC ...... G06Q 20/00–20/425; G06Q 30/00–30/08; G06Q 50/00–50/34; H04L 63/00–63/308; G06F 21/00–21/88
 See application file for complete search history.

(56) References Cited

U.S. PATENT DOCUMENTS

| | | | |
|---|---|---|---|
| 4,558,176 A | 12/1985 | Arnold et al. | |
| 4,796,220 A | 1/1989 | Wolfe | |
| 5,138,712 A | 8/1992 | Corbin | |
| 5,199,066 A | 3/1993 | Logan | |
| 5,260,999 A | 11/1993 | Wyman | |
| 5,553,143 A | 9/1996 | Ross et al. | |
| 5,671,412 A | 9/1997 | Christiano | |
| 5,742,757 A | 4/1998 | Hamadani et al. | |
| 5,758,068 A | 5/1998 | Brandt et al. | |
| 5,790,664 A | 8/1998 | Coley et al. | |
| 5,933,497 A | 8/1999 | Beetcher et al. | |
| 6,006,190 A | 12/1999 | Baena-Arnaiz et al. | |
| 6,023,620 A | 2/2000 | Hansson | |
| 6,044,471 A | 3/2000 | Colvin | |
| 6,173,446 B1 | 1/2001 | Khan et al. | |
| 6,188,995 B1 | 2/2001 | Garst et al. | |
| 6,260,141 B1 | 7/2001 | Park | |
| 6,799,277 B2 * | 9/2004 | Colvin | 726/22 |

(Continued)

FOREIGN PATENT DOCUMENTS

WO  WO2007132474  11/2007

*Primary Examiner* — Mohammad A Nilforoush (74) *Attorney, Agent, or Firm* — Maeve McCarthy, Esq.; George S. Blasiak, Esq.; Heslin Rothenberg Farley & Mesiti P.C.

(57) ABSTRACT

A software license and a software installation process are managed. A status of the license can be one of at least a third party reserved status, a requester reserved status, a requester allocated status, and an available status. A first module can be operative to change the status of the license from the third party reserved status to the requester allocated status in response to receiving a mode selection. The mode selection can correspond to one of one or more modes. The modes can comprise a reserve license mode, a remove reserve mode, a request license allocation mode, a return excess license to inventory mode, an ordering mode, and an add license to inventory mode. The first module can be operative in at least one of the modes.

17 Claims, 6 Drawing Sheets

(56) References Cited

U.S. PATENT DOCUMENTS

| | | | |
|---|---|---|---|
| 6,901,386 B1* | 5/2005 | Dedrick et al. ............... 705/59 |
| 6,918,038 B1* | 7/2005 | Smith et al. .................. 726/22 |
| 7,133,917 B2 | 11/2006 | Re et al. |
| 7,139,737 B2 | 11/2006 | Takahashi et al. |
| 7,171,662 B1 | 1/2007 | Misra et al. |
| 7,197,466 B1 | 3/2007 | Peterson et al. |
| 7,231,370 B1* | 6/2007 | Kapur ........................... 705/59 |
| 7,343,297 B2 | 3/2008 | Bergler et al. |
| 7,346,585 B1 | 3/2008 | Alabraba et al. |
| 7,467,404 B2 | 12/2008 | McAllister et al. |
| 7,519,561 B2 | 4/2009 | Boomershine et al. |
| 7,536,356 B2 | 5/2009 | Eng |
| 7,565,325 B2 | 7/2009 | Lenard et al. |
| 7,636,693 B2 | 12/2009 | Faur et al. |
| 2004/0078339 A1 | 4/2004 | Goringe et al. |
| 2004/0143746 A1* | 7/2004 | Ligeti et al. .................. 713/185 |
| 2007/0005505 A1* | 1/2007 | D'Alo et al. .................. 705/59 |
| 2008/0005029 A1* | 1/2008 | Ando .................... G06F 21/10 705/51 |
| 2008/0133289 A1 | 6/2008 | Armour et al. |
| 2008/0306786 A1* | 12/2008 | Lonowski et al. ............. 705/7 |
| 2009/0299791 A1 | 12/2009 | Blake et al. |

* cited by examiner

SOFTWARE LICENSE AND INSTALLATION PROCESS MANAGEMENT WITHIN AN ORGANIZATION

BACKGROUND

The present invention relates to software management, and more specifically, to software license and installation process management within an organization.

The computing environment of an organization may be comprised of a number of computers and other programmable data processing apparatuses including servers, midrange systems, mainframes, personal computers, laptops, netbooks, and wireless devices such as smart phones and other cellular devices, each of which may be equipped with a number of software products. Each of the software products may have a corresponding license defining the legal terms by which the software may be used and copied. Typically, the license must be obtained before the software product can be installed. In an organizational setting, the license may be obtained from the organization's inventory.

The term "organization" is used herein to refer to a social arrangement that pursues its own collective goals, controls its own performance, or has a boundary separating it from its environment. Examples of an organization include a for-profit or non-profit business unit a social club, and a family unit.

SUMMARY

System, computer program product, and method for managing a software license and a software installation process. In one embodiment, the method comprises: communicatively coupling a first module to a repository storing the license, the status of the license being one of at least a third party reserved status, a requester allocated status, and an available status, the third party reserved status being the status that the license is reserved for a third party, the requester allocated status being the status that the license is allocated to a requester, the available status being the status that the license is available, the first module comprising digital logic for changing the status of the license, the first module being operative in at least one of one or more modes; receiving a mode selection, the mode selection being one of the modes; and changing the status of the license from the third party reserved status to the requester allocated status using the digital logic of the first module in response to receiving the mode selection.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the present invention are directed toward managing a software license and a software installation process. Embodiments of the present invention provide for a governance module for managing the license. The governance module can change a status of the license in response to receiving a mode selection. In one embodiment, a status of the license can be one of at least a third party reserved status, a requester reserved status, a third party allocated status, a requester allocated status, and an available status. The requester can be a party currently requesting a change in the status of the license. When the status of the license is available status, the license is available to be reserved for, or allocated to, the requester. When the status of the licenses is third party reserved status or requester reserved status, the license is reserved for possible future allocation to the third party or the requester, respectively, but software subject to the license cannot be installed on a computer or other programmable data processing apparatus. When the status of the license is third party allocated status or requester allocated status, the third party or the requester, respectively, can install software subject to the license on a computer or other programmable data processing apparatus.

The governance module can change the status of the license from third party reserved status to requester allocated status in response to receiving the mode selection. The governance module can be utilized for this purpose if, for example, the third party and the requester enter into an "Override Agreement" whereby the third party agrees that the license reserved for the third party can be allocated to the requester. The third party and the requester can consider any number of factors in negotiating the "Override Agreement," such as the urgency of their respective business needs and budgets for procuring additional licenses. If an "Override Agreement" is reached and the license is allocated to the requester, the governance module can be utilized to request procurement of a new license for the third party to reserve once received so that the third party is made whole.

In systems known to the present inventors, factors such as those mentioned above are not considered before a license reserved by a third party can be allocated to a requester. Instead, in known systems, a requester having an immediate need for a license can revoke a license allocated to a third party when the third party underutilizes the corresponding software. The inventors know of no solution that considers the above mentioned factors or provides the additional advantage of making the third party whole.

Embodiments of the present invention also provide for a deployment module for managing the software installation process. The deployment module can be communicatively coupled to an ongoing monitor for monitoring the software installation process. In one embodiment, the deployment module can direct the ongoing monitor to terminate the software installation process in response to receiving an authentication request from the ongoing monitor, e.g., if the authentication request does not comprise an authentication mechanism allocated to a change requester for use in connection with the software installation process. The deployment module can allocate the authentication mechanism to the change requester, in response to a request from, e.g., an approver such as a change review board, a server management team, a manager, or a parent. This is particularly advantageous in that only organization-approved software can be installed on a computer or other programmable data processing apparatus of the organization. For example, software downloaded from the Internet, which may have an increased risk of containing malware such as viruses or adware that can, among other things, create damage to computers or other programmable data processing apparatuses of the organization, cannot be installed without organizational approval and an authentication mechanism.

Figure 1:
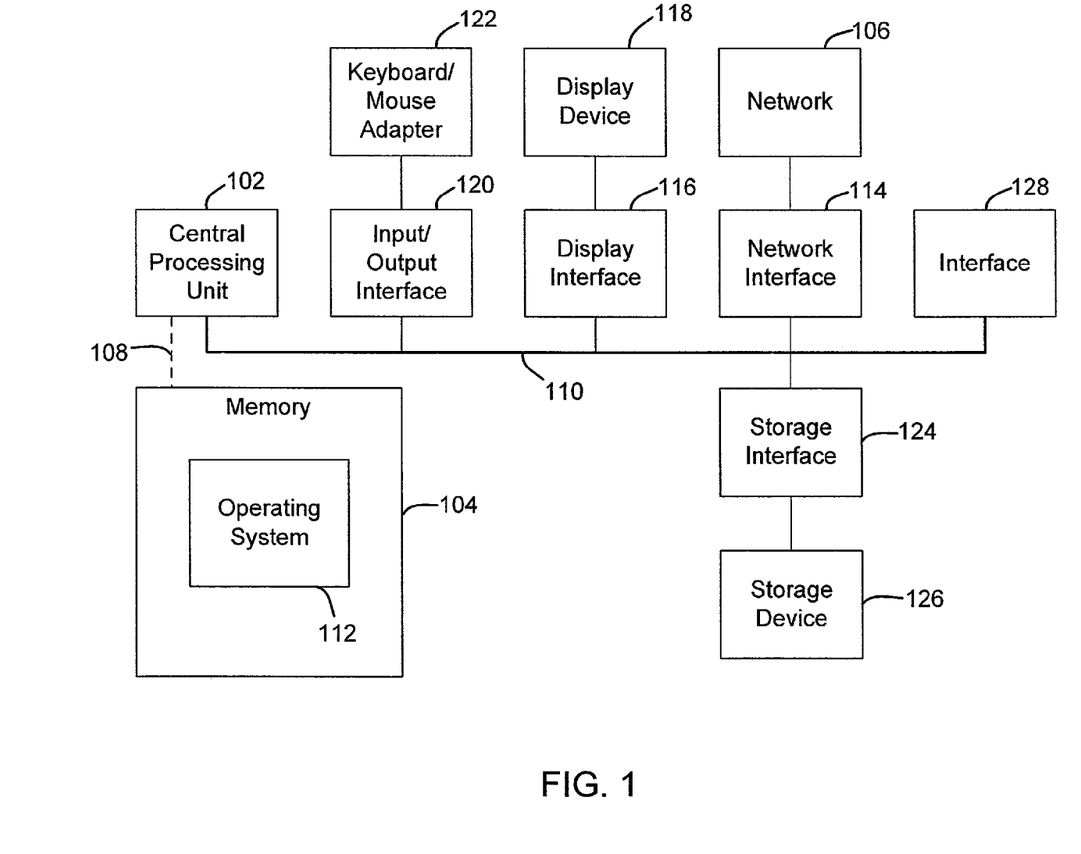
FIG. 1 is a hardware overview of a computer system according to an embodiment of the present invention.

Referring now to FIG. 1 a simplified block diagram of a computer 100 suitable for implementing embodiments of the present invention is shown. Computer 100 can be a workstation, server, mainframe computer, notebook or laptop computer, desktop computer, mobile phone, wireless device, set-top box, or other programmable data processing apparatus. Other possibilities for computer 100 are possible, including a computer having capabilities other than those ascribed herein and possibly beyond those capabilities.

In the depicted embodiment, computer 100 has central processing unit (CPU) 102, which is a programmable processor for executing programmed instructions stored in memory 104. CPU 102 can be a reduced instruction set (RISC) microprocessor such as a PowerPC® processor from IBM® Corporation, an x86 compatible processor such as a Pentium® processor from Intel® Corporation, an Athlon® processor from Advanced Micro Devices®, or any other suitable processor. In other embodiments, CPU 102 may comprise one or more CPUs distributed across one or more locations, e.g., on a client and server.

CPU 102 can be connected to memory 104 either through a dedicated system bus 108 and/or a general system bus 110. Memory 104 can be a random access semiconductor memory for storing application data for processing such as that in a database partition. Memory 104 is depicted conceptually as a single monolithic entity. However, in other embodiments, memory 104 can also be arranged in a hierarchy of caches and in other memory devices, in a single physical location, or distributed across a plurality of physical systems in various forms. Memory 104 can include hard disk, tape, or other storage media. FIG. 1 illustrates that operating system 112 may be stored in memory 104. Memory 104 can also serve as a store for a governance module, a deployment module, an asset management repository, and a configuration management database, which are described in greater detail below. It is appreciated that embodiments of the present invention can be implemented in a distributed computing environment having a plurality of computers 100 communicating via a suitable network 106.

Operating system 112 can provide functions such as device interface management, memory management, and multiple task management. Operating system 112 can be a Unix based operating system such as the AIX® operating system from IBM®, a non-Unix based operating system such as the Windows® family of operating systems from Microsoft®, a network operating system such as JavaOS® from Sun Microsystems®, or any other suitable operating system. CPU 102 can be suitably programmed to read, load, and execute instructions of operating system 112. CPU 102 can also be suitably programmed to read, load, and execute instructions of a governance module and a deployment module, as described in greater detail below. Other programs can include server software applications in which network interface 114 interacts with the server software application to enable computer 100 to function as a network server via network 106.

General system bus 110 can support transfer of data, commands, and other information between various subsystems of computer 100. While shown in simplified form as a single bus, general system bus 110 can be structured as multiple buses arranged in hierarchical form. Display interface 116 supports video display device 118, which is a cathode-ray tube display or a display based upon other suitable display technology. The input/output interface 120 can support devices suited for input and output, such as keyboard or mouse device 122, and a disk drive unit (not shown). Storage interface 124 can support one or more storage devices 126, which could include a magnetic hard disk drive or CD-ROM, although other types of data storage devices can be used, including removable media.

Interface 128 can be used for operationally connecting many types of peripheral computing devices to computer system 100 via general system bus 110, such as printers, bus adapters, and other computers. Network interface 114 can provide a physical interface to a network 106, such as a local area network (LAN) or the Internet. Network interface 114 can be any type of adapter that provides an interface between computer 100 and network 106, such as a modem that can be connected to a transmission system such as a telephone line, an Ethernet adapter, or a Token Ring adapter. Computer 100 can be connected to another network server via a LAN using an appropriate network protocol and the network server that can in turn be connected to the Internet.

Figure 2:
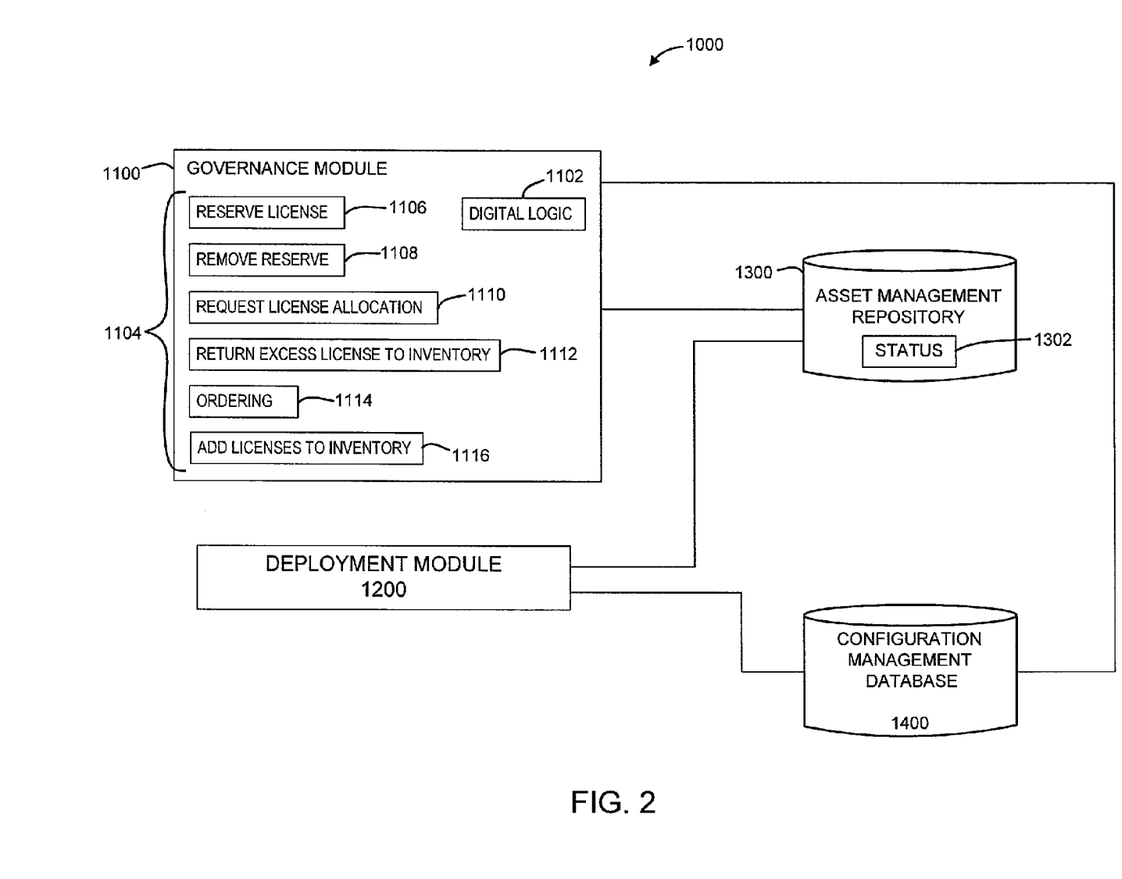
FIG. 2 is a block diagram of a system according to an embodiment of the present invention.

FIG. 2 is an exemplary embodiment of a system 1000 for managing a software license (not shown) and a software installation process 504 according to the present invention. System 1000 can comprise a governance module 1100, a deployment module 1200, an asset management repository 1300, and a configuration management database (CMDB) 1400. Governance module 1100 and deployment module 1200 can be communicatively coupled to repository 1300 and CMDB 1400. Governance module 1100 can comprise digital logic 1102 for changing a status 1302 of the license. Governance module 1100 can be operative in at least one of one or more modes 1104. Modes 1104 can comprise a reserve license mode 1106, a remove reserve mode 1108, a request license allocation mode 1110, a return excess license to inventory mode 1112, an ordering mode 1114, and an add license to inventory mode 1116.

Repository 1300 can store status 1302. In one embodiment, status 1302 can be one of at least a third party reserved status, a requester reserved status, a requester allocated status, and an available status. In another embodiment, status 1302 can be one of at least a third party reserved status, a requester reserved status, a third party allocated status, a requester allocated status, and an available status. The third party reserved status can be the status 1302 that a third party has reserved the license. The requester reserved status can be the status 1302 that the requester has reserved the license. The requester can be a party currently requesting a change in status 1302. The third party allocated status can be the status 1302 that the license is allocated to the third party. The requester allocated status can be the status 1302 that the license is allocated to the requester. The available status can be the status 1302 that the license is available, e.g., to be reserved for or allocated to the requester. In one embodiment, governance module 1100 can generate an availability report comprising status 1302. CMDB 1400 can store information relating to aspects of an information system of the organization, including records of software installed on particular computers or other programmable data processing apparatuses of the organization.

Figure 3:
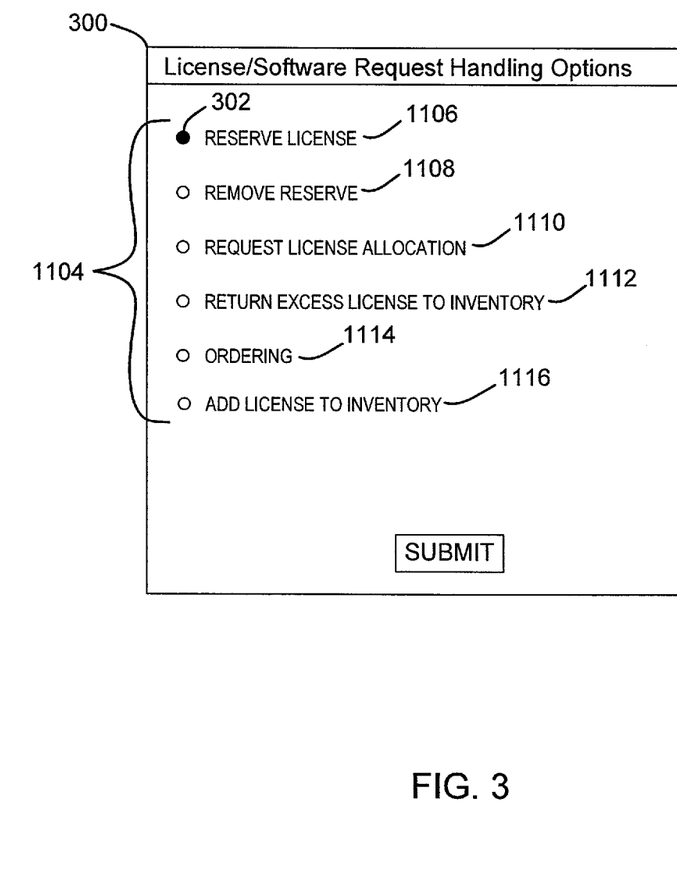
FIG. 3 is a user interface according to an embodiment of the present invention.

Referring to FIG. 3, governance module 1100 can receive a mode selection 302 corresponding to one of modes 1104. In one embodiment, governance module 1100 can receive mode selection 302 from a user interface 300 in communication with governance module 1100. User interface 300 can be a graphical user interface (GUI), a web-based user interface (WUI), or any other suitable interface from which governance module 1100 can receive mode selection 302.

Governance module 1100 can change the status 1302 of the license from the available status to the requester reserved status in response to receiving mode selection 302. For example, for requester Jones, governance module 1100 can change the status 1302 of the license from the available status to the status that the license is reserved for requester Jones in response to receiving mode selection 302 corresponding to reserve license mode 1106. Jones can hold the reservation pending funding and/or approval of a project for which Jones requires the license. Governance module 1100 can also be restricted from being operative to change the status 1302 of the license from the third party reserved status to the requester reserved status in response to receiving mode selection 302. For example, if the status 1302 of the license is the status 1302 that the license is reserved for a third party, e.g., Smith, governance module 1100 can be restricted from being operative to change the status of the license from reserved for third party Smith to the status that the license is reserved for requester Jones in response to receiving mode selection 302. Governance module 1100 can report that the status 1302 of the license is third party reserved status in response to receiving mode selection 302, and can request direction from the requester. In response, requester Jones can, e.g., take the direction of requesting procurement of a new license using ordering mode 1114. In ordering mode 1114, governance module 1100 can submit a procurement request to an order management team, and can notify the requester that the procurement request has been made. For the purposes of this disclosure, various forms of the term "procure" can include obtaining a price quote. In response to receiving the new license, Jones can add the new license to the organization's inventory using add license to inventory mode 1116 and can reserve the new license using reserve license mode 1106.

Governance module 1100 can change the status 1302 of the license from the requester reserved status to the available status in response to receiving mode selection 302. For example, for requester Jones, governance module 1100 can change the status 1302 of the license from the status that the license is reserved by requester Jones to the available status in response to receiving mode selection 302 corresponding to remove reserve mode 1108. Jones may have chosen to remove his reservation for the license because, for example, the organization denied funding and/or approval for the project for which he required the license. Changing the status 1302 of the license from the requester reserved status to the available status is particularly beneficial in that it maximizes the availability of the license for reservation and/or allocation.

Governance module 1100 can change the status 1302 of the license from the requester reserved status to the requester allocated status in response to receiving mode selection 302. To illustrate, governance module 1100 can be operative to change the status 1302 of the license from the status that the license is reserved for requester Jones to the status that the license is allocated to requester Jones in response to receiving mode selection 302 corresponding to request license allocation mode 1110. Governance module 1100 can also change status 1302 from the available status to the requester allocated status in response to receiving mode selection 302. By way of example with respect to requester Jones, governance module 1100 can change the status 1302 of the license from the available status to the status that the license is allocated to requester Jones in response to receiving mode selection 302 corresponding to request license allocation mode 1110.

A conflict arises when the requester desires allocation of the license, but the status 1302 of the license is the third party reserved status. For example, requester Jones may request that the license be allocated to him, but third party Smith holds a reservation for the license. To resolve the conflict, Smith and Jones may enter into an "Override Agreement," whereby Smith agrees to relinquish his reservation of the license because, e.g., Smith's business need for the license is less urgent than Jones's business need for the license or Smith's budget allows Smith to procure a new license. Governance module 1100 can be operative to perform an "override" by changing the status 1302 of the license from the third party reserved status to the requester allocated status in response to receiving mode selection 302. In the previous example, governance module can be operative to change the status 1302 of the license from the status that the license is reserved for third party Smith to the status that the license is allocated to requester Jones in response to receiving mode selection 302 corresponding to request license allocation mode 1110. Governance module 1100 can receive permission, e.g., from a user of user interface 300, to change status 1302 from the third party reserved status to the requester allocated status in response to receiving mode selection 302.

In the previous example, Smith has lost the benefit of having reserved the license. To be made whole, Smith can request procurement of a new license using ordering mode 1114. In response to receiving the new license, Smith can add the new license to the organization's inventory using add license to inventory mode 1116 and can reserve the new license using reserve license mode 1106.

Governance module 1100 can be restricted from being operative to change the status 1302 from the third party allocated status to the available status, the third party reserved status, and the requester reserved status in response to receiving mode selection 302. If the status 1302 of the license is the third party allocated status, e.g., the status that the license is allocated to third party Smith, the requester, e.g., Jones, can request procurement of a new license using ordering mode 1114. In response to receiving the new license, the requester can add the new license to the organization's inventory using add license to inventory mode 1116 and can allocate the license to the requester using request license allocation mode 1110.

Governance module 1100 can change the status 1302 of the license from the requester allocated status to the available status in response to receiving mode selection 302. For example, for requester Jones, governance module 1100 can change the status 1302 of the license from the status that the license is allocated to requester Jones to the available status in response to receiving mode selection 302 corresponding to return excess license to inventory mode 1112. Jones may no longer need the license due to, for example, server consolidation or project completion. Governance module 1100 can notify CMDB 1400 of the change in status 1302 from requester allocated status to available status so that CMDB 1400 can update installation records of the organization. Changing the status 1302 of the license from the requester allocated status to the available status also beneficially maximizes the availability of the license for reservation and/or allocation.

Figure 4:
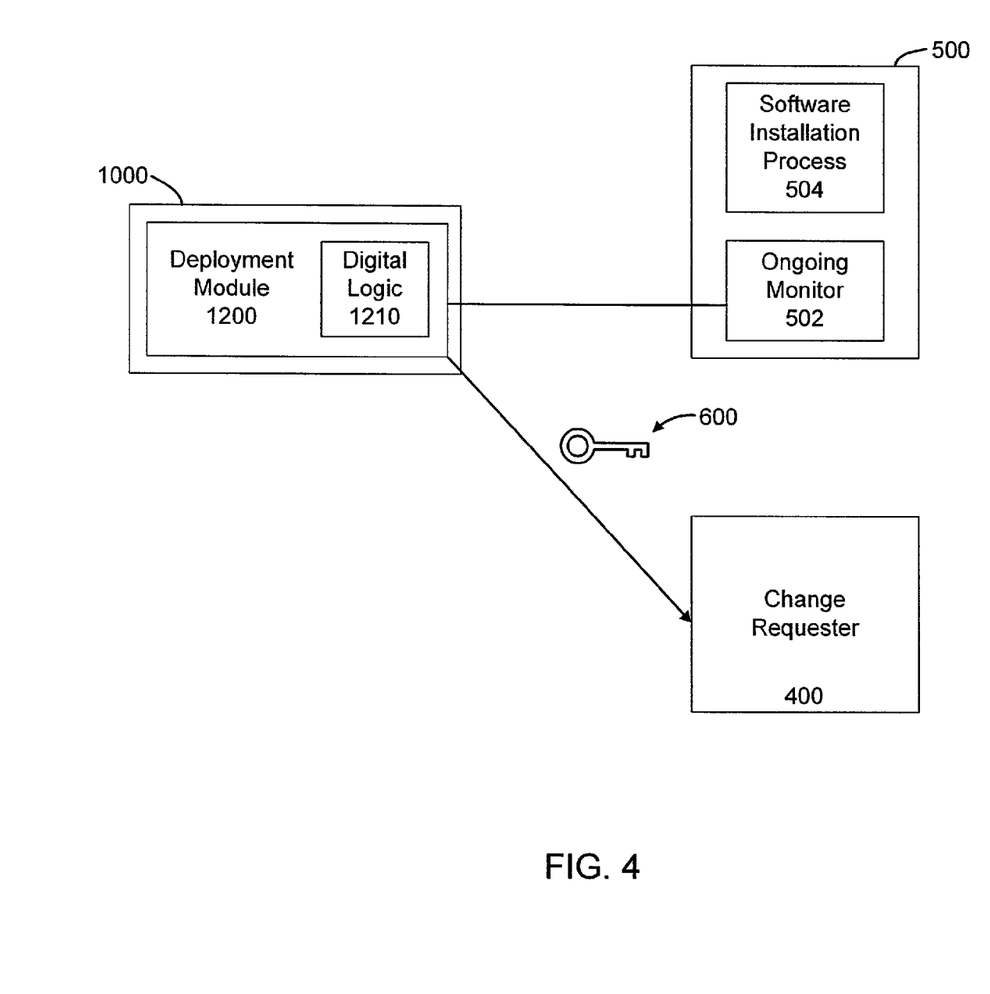
FIG. 4 is a block diagram illustrating operation of a deployment module according to an embodiment of the present invention.

Referring now to FIG. 4, further details of deployment module 1200 are now discussed. A change requester 400 can seek permission from an approver such as a change review board, a server management team, a manager, or a parent to initiate software installation process 504. In one embodiment, software installation process 504 can be a process installing software subject to the license, the status 1302 of the license being the requester allocated status. Deployment module 1200 can respond to a request from change requester 400 or from the approver to generate an authentication mechanism 600 and provide authentication mechanism 600 to change requester 400 for use during software installation process 504. Authentication mechanism 600 can be, e.g., a password or a unique release key. The unique release key can be a single-use release key that change requester 400 can use only in connection with software installation process 504. Deployment module 1200 can be communicatively coupled to an ongoing monitor 502 for monitoring software installation process 504. Client installation system 500 can have a CPU suitably programmed to read, load, and execute instructions of ongoing monitor 502 and software installation process 504. Client installation system 500 can be a system having the structure of computer 100 shown in FIG. 1.

Ongoing monitor 502 can detect software installation process 504 executing on client installation system 500. Ongoing monitor 502 can pause software installation process 504, can request that an installer provide authentication mechanism 600 to ongoing monitor 502, and can send an authentication request (not shown) to deployment module 1200. The authentication request can comprise a response, e.g, authentication mechanism 600, from the installer. Deployment module 1200 can receive the authentication request from ongoing monitor 502. Deployment module 1200 can direct ongoing monitor 502 to terminate software installation process 504 in response to receiving the authentication request, e.g., if deployment module 1200 the authentication request does not comprise authentication mechanism 600. In that event, deployment module 1200 request that ongoing monitor 502 send to deployment module 1200 an identity of the installer, e.g., a user name of a user logged on to client installation system 500, an internet protocol (IP) address of client installation system 500, and a name of the software subject to software installation process 504 to deployment module 1200 for forwarding to an investigator such as a security manager, a duty manager, or incident manager for investigation and follow-up with the installer, and/or to an architect management unit to determine whether software subject to software installation process 504 should be procured.

In an example of the foregoing, if Jones downloads a solitaire game from the Internet onto client installation system 500 without having received permission from an approver and initiates software installation process 504 for the game, ongoing monitor 502 can request that Jones provide authentication mechanism 600 to ongoing monitor 502. Ongoing monitor 502 can accept a response from Jones, can formulate an authentication request comprising the response, and can send the authentication request to deployment module 1200. Deployment module 1200 can receive the authentication request from ongoing monitor 502 to verify, e.g., that the response comprises authentication mechanism 600. As Jones has never received authentication mechanism 600, Jones's response to ongoing monitor 502 may comprise a guess. Deployment module 1200 can receive the authorization request comprising the guess from ongoing monitor 502, and can direct ongoing monitor 502 to terminate software installation process 504. Deployment module 1200 can capture Jones's user name and the IP address of client installation system 500, forward them to the security manager for investigation and follow-up with Jones, and forward them to the architect management unit to determine whether the organization should add a solitaire license to the organization's inventory using add license to inventory mode 1116.

Deployment module 1200 can notify ongoing monitor 502 to permit software installation process 504 to resume in response to, e.g., verifying that the response comprises authentication mechanism 600. Ongoing monitor 502 can detect when software installation process 504 is complete, and can send implementation data such as one or more configuration items (CI's) and the date on which the installation completed to deployment module 1200 for storing in repository 1300. Deployment module 1200 can generate an installation record for software installation process 504 based on the implementation data and can send the installation record to an asset management unit. Deployment module 1200 can store the installation record in CMDB 1400. Deployment module 1200 can further send the installation record to a financial management unit for action such as charge back and/or usage billing.

Figure 5A:
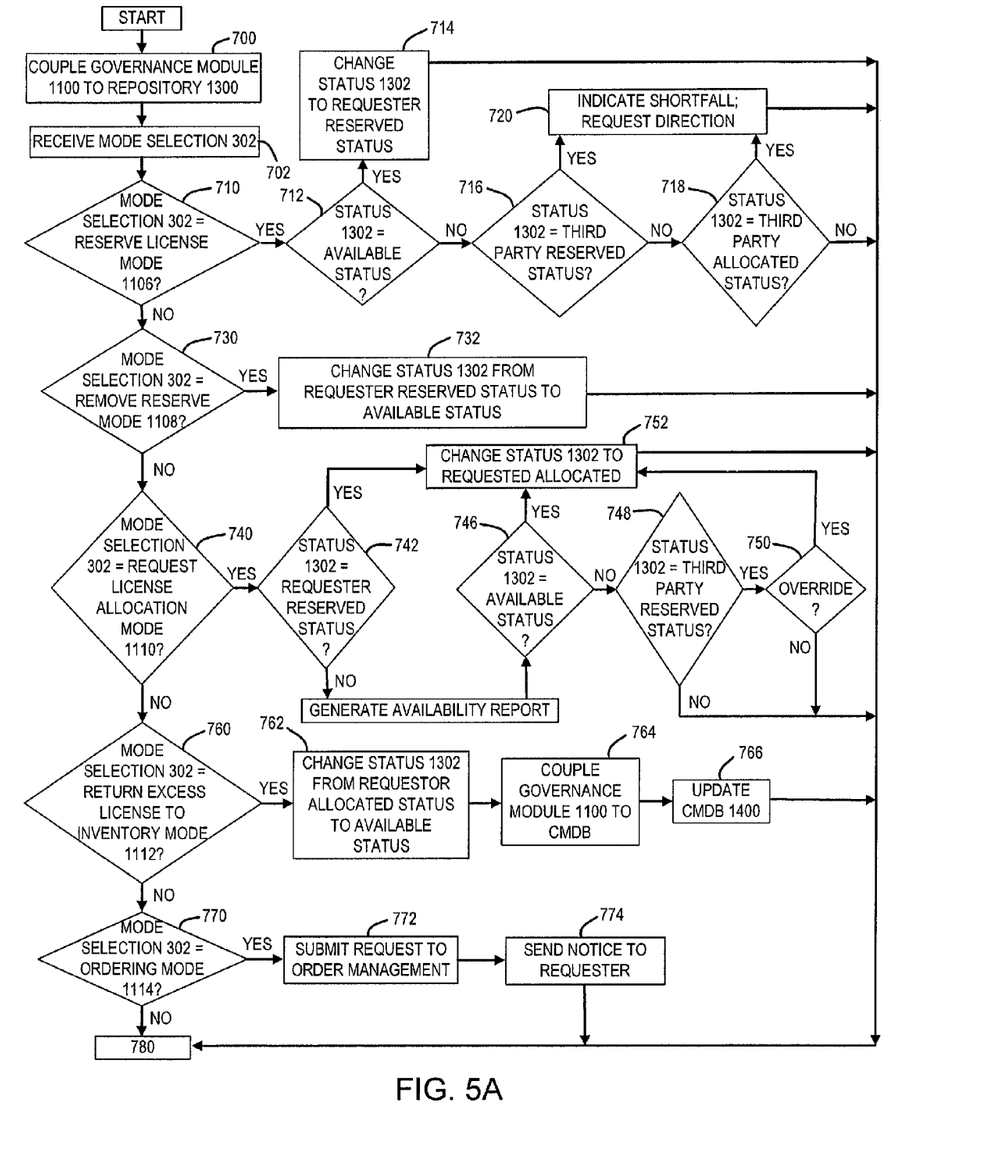
FIGS. 5a-5b are flowcharts depicting logic which may be used when implementing an embodiment of the present invention.
Figure 5B:
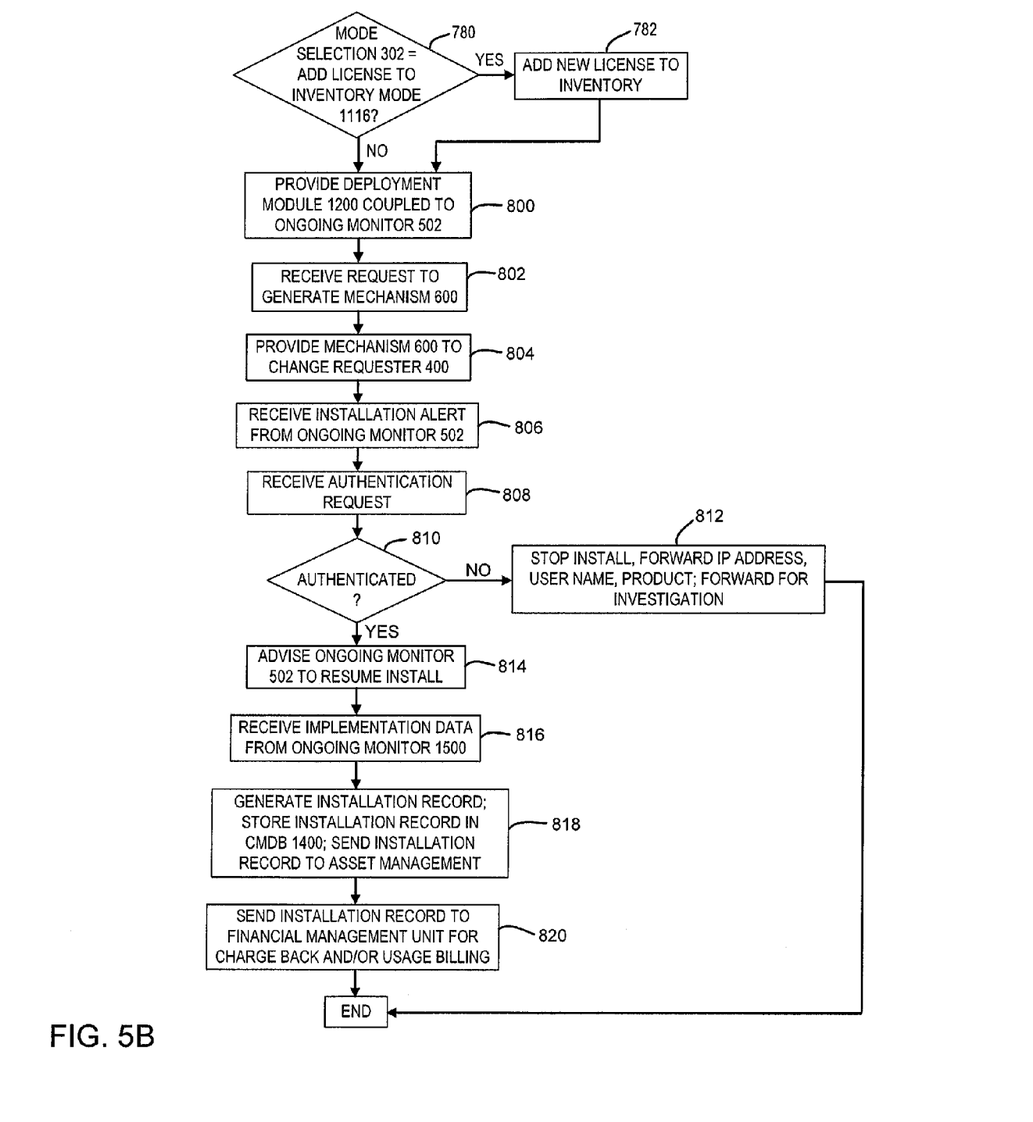

FIGS. 5a-5b are flowcharts describing a method for managing the license and software installation process 504 according to an embodiment of the present invention. Processing commences at block 700, wherein system 1000 can communicatively couple governance module 1100 to asset management repository 1300. At block 702, governance module 1100 can receive mode selection 302. In one embodiment, governance module 1100 can receive mode selection 302 from user interface 300. At blocks 710, 730, 740, 760, 770, and 780, governance module 1100 can determine whether mode selection 302 corresponds to one of modes 1104.

If governance module 1100 determines at block 710 that mode selection 302 is reserve license mode, processing moves to block 712. At block 712, governance module 1100 can determine whether status 1302 is available status. If status 1302 is available status, governance module 1100 can change status 1302 to requester reserved status at block 714, and thereby reserve the license for the requester. If status 1302 is not available status at block 712, processing moves to block 716. If governance module 1100 determines at block 716 that status 1302 is third party reserved status or at block 718 that status 1302, processing moves to block 720, wherein governance module 1100 can notify the requester that the license is not available and can request direction from the requester.

If governance module 1100 determines at block 730 that mode selection 302 corresponds to remove reserve mode 1108, processing moves to block 732. At block 732, governance module 1100 can change status 1302 of the license from requester reserved status to available status, and thereby the license becomes available for reservation and/or allocation.

If governance module 1100 determines at block 740 that mode selection 302 corresponds to request license allocation mode 1110, processing moves to block 742. If governance module 1100 determines at block 742 that status 1302 is requester reserved status or at block 746 that status 1302 is available status, governance module 1100 can change status 1302 to requester allocated status at block 752, and thereby the license has been allocated to the requester. In the depicted embodiment, at block 744, governance module 1100 can generate an availability report comprising status 1302 in the event that status 1302 is not requester reserved status at block 742.

At block 748, governance module 1100 can determine whether status 1302 is third party reserved status. In that event, the requester and a third party may negotiate an "Override Agreement" whereby the third party agrees that the license, while reserved to the third party, may be allocated to the requester. At block 750, governance module 1100 can determine whether to perform an override. In one embodiment, the determination at block 750 can be based on permission to perform the override. The permission can be inputted into user interface 300 in response to an "Override Agreement" being reached between the requester and the third party. If governance module 1100 determines to override at block 750, governance module 1100 can change the status 1302 of the license to requester allocated at block 752, and thereby the license has been allocated to the requester.

If governance module 1100 determines at block 760 that mode selection 302 corresponds to return excess license to inventory mode 1112, processing moves to block 762. At block 762, governance module 1100 can change status 1302 from requester allocated status to available status so that, e.g., the license is now available for reservation/allocation. At block 764, governance module 1100 can be communicatively coupled to CMDB 1400. At block 766, governance module 1100 can notify CMDB 1400 that status 1302 is available status so that CMDB 1400 can update installation records of the organization.

If governance module 1100 determines at block 770 that mode selection 302 corresponds to ordering mode 1114, processing moves to block 772. At block 772, governance module 1100 can submit a procurement request for a new license to an order management team, and at block 774, governance module 1100 can notify the requester that the procurement request has been submitted. If at block 780, governance module 1100 determines that mode selection 302 corresponds to add license to inventory mode 1116, governance module 1100 can add a new license to a license inventory of the organization. Procurement of the new license may have been requester via ordering mode 1114. System 1000 can manage the new license in the same manner as the license subject to this disclosure.

At block 800, system 1000 can communicatively couple deployment module 1200 to ongoing monitor 502. At block 802, deployment module 1200 can receive a request from an approver such as a change review board, a server management team, a manager, or a parent to generate authentication mechanism 600. The approver may make the request on behalf of change requester 400. Processing then moves to block 804, wherein deployment module 1200 can provide authentication mechanism 600 to change requester 400. Processing then moves to block 806, wherein deployment module 1200 can receive an alert from ongoing monitor 502 that software installation process 504, e.g., on client installation system 500, has been paused. Ongoing monitor 502 can request that an installer initiating software installation process 504 provide authentication mechanism 600 to ongoing monitor 502. Processing then moves to block 808, wherein deployment module can receive an authentication request from ongoing monitor 502. The authentication request can comprise a response, e.g., authentication mechanism 600, from the installer to ongoing monitor 502. Processing then moves to block 810, wherein deployment module 1200 can verify that the authentication request comprises authentication mechanism 600. This can enable deployment module 1200 to determine whether software installation process 504 was properly authorized.

If at block 810, deployment module 1200 determines that, e.g., the authentication request does not comprise authentication mechanism 600, processing moves to block 812, wherein deployment module 1200 can direct ongoing monitor 502 to terminate software installation process 504 on client installation system 500. Deployment module 1200 can further request that ongoing monitor 502 send to deployment module 1200 information such as the IP address of client installation system 500, an identity of the installer, e.g., a user name of the user logged on to client installation system 500, and the name of the software subject to software installation process 504. Deployment module 1200 can pass the information on to a security manager, a duty manager, or incident manager for investigation and follow-up.

If at block 810, deployment module 1200 determines that, e.g., the authentication request comprises authentication mechanism 600, processing moves to block 814, wherein deployment module 1200 can advise ongoing monitor 502 to resume software installation process 504. Processing then moves to block 816, wherein deployment module 1200 can receive implementation data from ongoing monitor 502 such as CI's and the date on which software installation process 504 completed. Processing then moves to block 818, wherein deployment module 1200 can generate an installation record for the completed installation on client installation system 500 based on the implementation data and can send the installation record to an asset management unit of the organization. At block 818, deployment module 1200 can store the installation record in CMDB 1400. Processing then moves to block 820, wherein deployment module 1200 can send the installation record to a financial management unit of the organization for action such as charge back and/or usage billing.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer system for managing software licenses and a software installation process, the computer system comprising a memory, a processor, and program code stored on the memory and that when executed by the processor causes the processor to perform a method comprising:

obtaining, by the processor, data representing a status of each of a plurality of software licenses and writing, by the processor, to the memory, the status of each of the plurality of licenses, each license of the plurality of licenses being one of at least a third party reserved status, a requester reserved status, a requester allocated status, and an available status, wherein the third party reserved status designates that the license is reserved for a third party, wherein the requester reserved status designates that the license is reserved for a requester, wherein the requester allocated status designates that the license is allocated to the requester, and wherein the available status designates that the license is available;

obtaining, by the processor, instructions from a requester to change the status of a license of the plurality of licenses, the instructions comprising a mode selection;

responsive to obtaining the mode selection, obtaining, by the processor, a current status of the license from the memory, determining, by the processor, that the current status of the license is the third party reserved status, receiving, by the processor, permission to perform an override of the status of the license and based on the permission, changing, by the processor, the current status of the license in the memory to requester allocated status;

after changing the status of the license to requester allocated status, receiving, by the processor, from an approver separate from the requester and the third party a request for an authentication mechanism for the requester;

based on the request from the approver generating, by the processor, the authentication mechanism and deploying the authentication mechanism to the requester;

monitoring, by the processor, the software installation process subject to the license, wherein the monitoring comprises the processor, responsive to obtaining an installation alert from the requester, wherein the alert indicates a pause in the software installation process, requesting the authentication mechanism, and responsive to obtaining the authentication mechanism, the processor, directing the requester to resume the software installation process;

obtaining, by the processor, during the monitoring, data indicating that the software installation process is completed; and writing, by the processor, the data indicating that the software installation process is completed to the memory.

2. The computer system of claim 1, the instructions further comprising permission to change the status of the license from the third party reserved status to the requester allocated status.

3. The computer system of claim 1, the method further comprising:
responsive to obtaining the mode selection, obtaining, by the processor, at least one license of the plurality of licenses in available status and changing the status to the requester reserved status.

4. The computer system of claim 1, the method further comprising:
responsive to obtaining the mode selection, obtaining, by the processor, at least one license of the plurality of licenses in requester reserved status and changing to the status to available status.

5. The computer system of claim 1, the method further comprising:
responsive to obtaining the mode selection, obtaining, by the processor, the at least one license and changing the status of the at least one license to the available status; and
disabling access to software associated with the at least one license wherein the disabling comprises sending a command to disable the software to a client.

6. The computer system of claim 1, wherein the instructions further comprise a request to procure a new license.

7. A computer program product for managing a software license and a software installation process, said computer program product comprising:
a memory readable by a processor and storing instructions that when executed by the processor cause the processor to perform a method comprising:
obtaining, by the processor, data representing a status of each of a plurality of software licenses and writing, by the processor, to the memory, the status of each of the plurality of licenses, each license of the plurality of licenses being one of at least a third party reserved status, a requester reserved status, a requester allocated status, and an available status,
wherein the third party reserved status designates that the license is reserved for a third party,
wherein the requester reserved status designates that the license is reserved for a requester,
wherein the requester allocated status designates that the license is allocated to the requester, and
wherein the available status designates that the license is available;
obtaining, by the processor, requester instructions from a requester to change the status of a license of the plurality of licenses, the requester instructions comprising a mode selection;
responsive to obtaining the mode selection, obtaining, by the processor, a current status of the license from the memory, determining, by the processor, that the current status of the license is the third party reserved status, receiving, by the processor, permission to perform an override of the status of the license, and based on the permission changing, by the processor, the current status of the license in the memory to requester allocated status;
after changing the current status of the license to requester allocated status, receiving, by the processor, from an approver separate from the requester and the third party, a request for an authentication mechanism for the requester;
based on the request from the approver, generating, by the processor, the authentication mechanism and deploying the authentication mechanism to the requester;
monitoring, by the processor, the software installation process subject to the license, wherein the monitoring comprises the processor, responsive to obtaining an installation alert from the requester, wherein the alert indicates a pause in the software installation process, requesting the authentication mechanism, and responsive to obtaining the authentication mechanism, the processor, directing the requester to resume the software installation process;
obtaining, by the processor, during the monitoring, data indicating that the software installation process is completed; and
writing, by the processor, the data indicating that the software installation process is completed to the memory.

8. The computer program product of claim 7, wherein the current status is the requester allocated status.

9. The computer program product of claim 7, the method further comprising: responsive to obtaining the mode selection, requesting procurement of a new license.

10. A method for managing a software license and a software installation process, the method comprising:
obtaining, by a processor, data representing a status of each of a plurality of software licenses and writing, by the processor, to a memory, the status of each of the plurality of licenses, each license of the plurality of licenses being one of at least a third party reserved status, a requester reserved status, a requester allocated status, and an available status,
wherein the third party reserved status designates that the license is reserved for a third party,
wherein the requester reserved status designates that the license is reserved for a requester,
wherein the requester allocated status designates that the license is allocated to the requester, and
wherein the available status designates that the license is available;
obtaining, by the processor, instructions from a requester to change the status of a license of the plurality of licenses, the instructions comprising a mode selection;
responsive to obtaining the mode selection, obtaining, by the processor, a current status of the license from the memory, determining, by the processor, that the current status of the license is the third party reserved status, receiving, by the processor, permission to perform an override of the status of the license, and based on the permission changing, by the processor, the current status of the license in the memory to requester allocated status;

after changing the current status of the license to requester allocated status, receiving, by the processor, from an approver separate from the requester and the third party, a request for an authentication mechanism for the requester;

based on the request from the approver, generating, by the processor, the authentication mechanism and providing, by the processor, the authentication mechanism to the requester;

monitoring, by the processor, the software installation process subject to the license, wherein the monitoring comprises the processor, responsive to obtaining an installation alert from the requester, wherein the alert indicates a pause in the software installation process, requesting the authentication mechanism, and responsive to obtaining the authentication mechanism, by the processor, directing the requester to resume the software installation process;

obtaining, by the processor, during the monitoring, data indicating that the software installation process is completed; and writing, by the processor, the data indicating that the software installation process is completed to the memory.

11. The method of claim 10, further comprising:

responsive to obtaining the mode selection, transforming the status of the license to the available status when the status of the license is the requester allocated status.

12. The method of claim 10, further comprising requesting procurement of a new license in response to obtaining the mode selection.

13. The computer system of claim 1, the monitoring further comprising: responsive to requesting the authentication mechanism and receiving an invalid authentication mechanism, directing the requester to terminate the software installation process.

14. The computer system of claim 1, wherein the authentication mechanism comprises an identifier representing the requester.

15. The computer system of claim 1, wherein the permission received is based on an Override Agreement being reached between the requester and the third party.

16. The computer system of claim 1, wherein the method includes, after changing the current status of the license to requester allocated status, performing a request, by the processor, to procure a new license for the third party.

17. The computer system of claim 1, wherein the method further includes, responsive to a request to change the status of the license to requester allocated status with the third party reserved status active, performing a request, by the processor, that the requester provide direction and permitting the requester to request procurement of a new license.

* * * * *